Dec. 12, 1961  R. D. TOLLEFSON  3,013,262
FM DOPPLER NAVIGATION SYSTEM UTILIZING FIRST FM SIDEBAND
Filed April 2, 1959  4 Sheets-Sheet 1

INVENTOR.
ROBERT D. TOLLEFSON
BY *Moody and Goldman*
ATTORNEYS

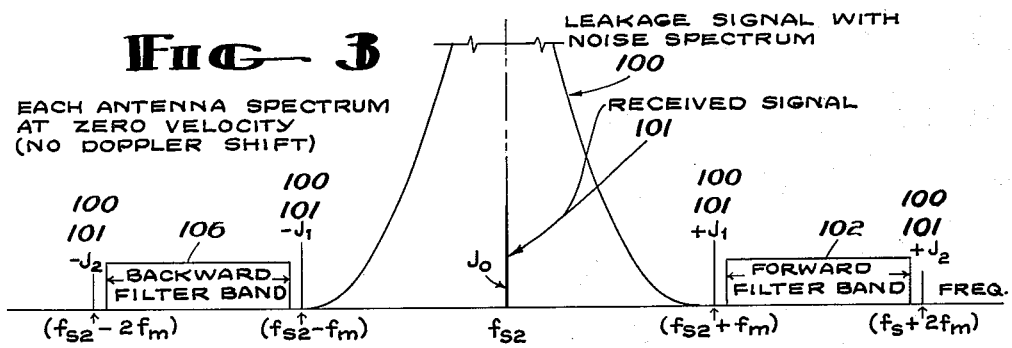
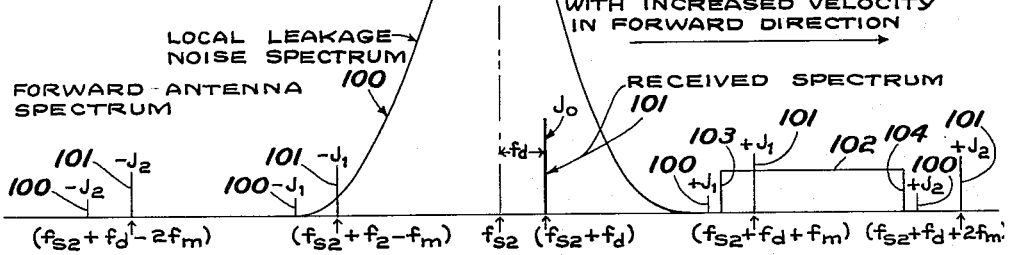
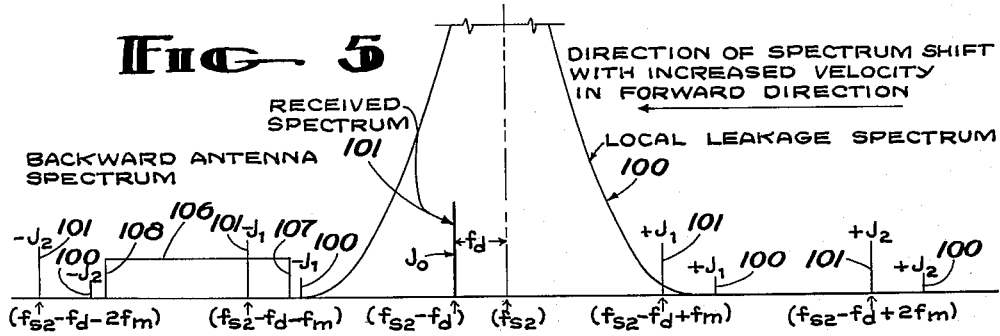
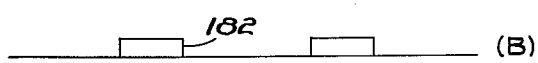
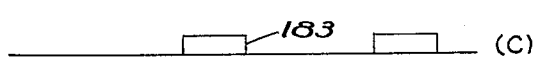
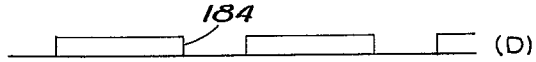

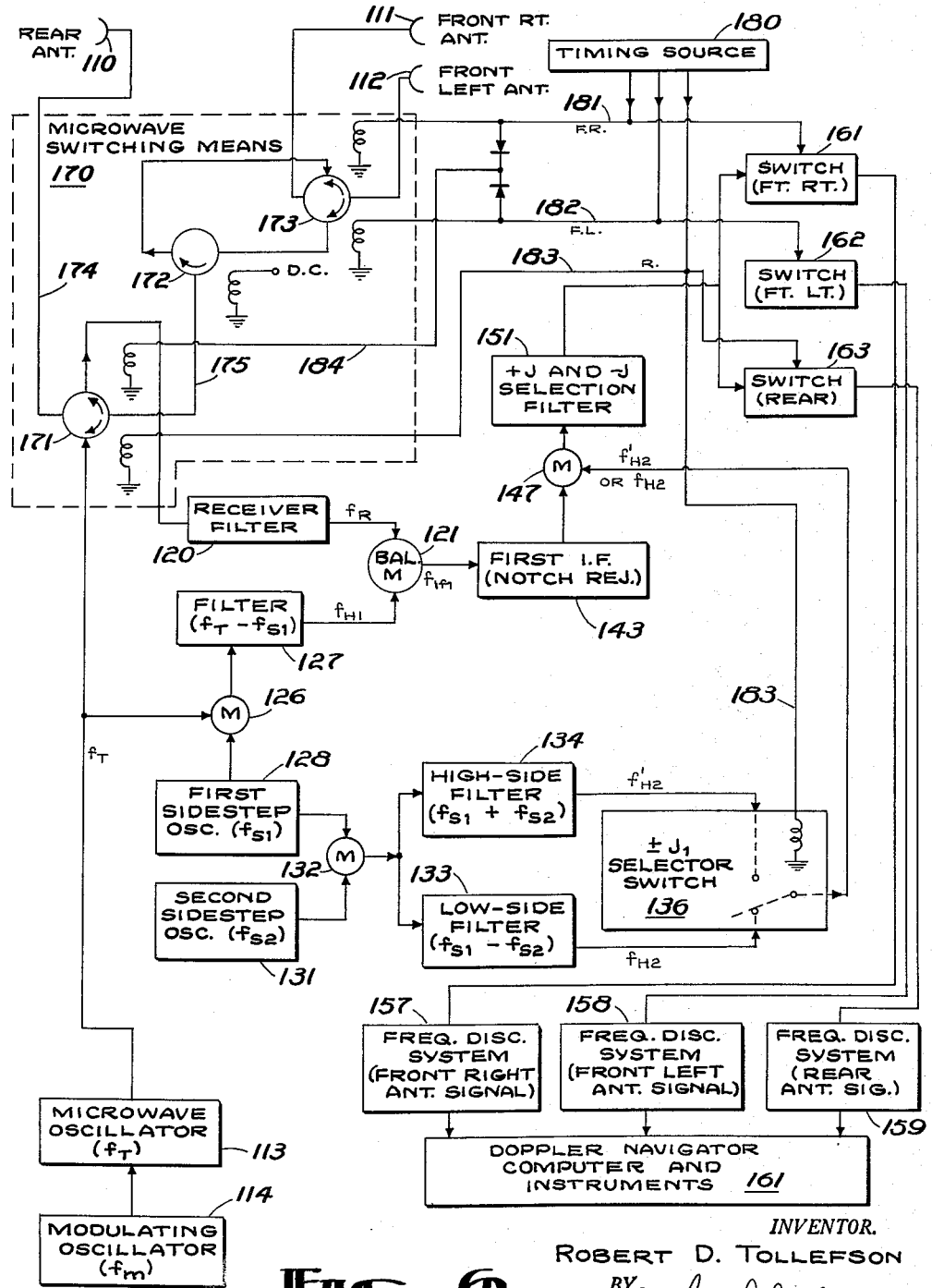

United States Patent Office 3,013,262
Patented Dec. 12, 1961

3,013,262
FM DOPPLER NAVIGATION SYSTEM UTILIZING FIRST FM SIDEBAND
Robert D. Tollefson, Cedar Rapids, Iowa, assignor to Collins Radio Company, Cedar Rapids, Iowa, a corporation of Iowa
Filed Apr. 2, 1959, Ser. No. 803,679
11 Claims. (Cl. 343—9)

This invention relates to a frequency system for frequency-modulated Doppler navigators useful during aircraft flight for determining drift-angle and ground speed.

Other frequency-modulated Doppler navigation systems are known in the art. Such systems generally include at least a pair of Doppler radar-antenna beams pointed downwardly toward the earth in different directions. Because of the forward velocity of the aircraft, there is a Doppler-frequency shift caused to the received radar signals. The ground direction of aircraft movement is related to the Doppler shifts of the signals and is electronically computed therefrom and displayed. Furthermore, the average Doppler shift of the beams is dependent upon the ground speed of the aircraft, which also is electronically computed and displayed.

Many frequency schemes are used in prior Doppler navigator systems. The simplest involves heterodyning the received signal of each antenna against the transmitted signal to directly obtain the Doppler shift as an audio signal. However, this simple scheme is undesirable at microwave frequencies such as 8800 mc. because the noise generated in microwave oscillators masks frequencies in which the Doppler information is carried.

A better prior frequency scheme for Doppler navigators is to frequency modulate the microwave frequency at many hundred kilocycles-per-second. Then the received signal is heterodyned with a portion of the transmitted signal to provide a heterodyned frequency-modulated signal centered about the Doppler-shifted frequency, which is audio. The Bessel-sidebands of the signal will be folded about zero frequency. As a result, the two sidebands of any given order will be spaced by the Doppler shift on opposite sides of an integral value (of that order) of the modulating frequency. Synchronous double-sideband or A.M. detection may then be used with any ordered pair to detect the Doppler-shift. Most of the oscillator noise is positioned in the low audio region. An ordered sideband pair is selected which is sufficiently removed from oscillator noise to be easily filtered. A conventional choice is the 3rd or 5th ordered sideband pair. For example, it may be generated using a modulating-frequency of about 500 kilocycles per second. Thus, the 3rd ordered sideband pair is centered at 1500 kilocycles, and they are centered 500 kilocycles away from the nearest other Bessel sideband pair. Thus, the filtering problem is made relatively simple.

However, other liabilities accrue to this conventional solution. For example, the choice of a high modulating frequency to simplify filtering causes a comb-type amplitude response for the received signal with changes of aircraft altitude. The comb response includes "signal altitude-holes," whereby at certain altitudes the signal amplitude falls to such low levels that it is lost in the noise; and the Doppler navigator thereby ceases to function. Where the signal is not in an "altitude-hole" but is adjacent to it, the signal is on a steep slope of the comb-response and has its spectrum skewed, which causes an error in the detection of the Doppler-frequency shift.

One of the "altitude-holes" in the conventional systems is around "zero-altitude." This "hole" prevents the Doppler navigator system from functioning during take off and landing operations and at very low altitudes. With a modulating signal of 500 kilocycles, the center of next altitude hole is at 980 ft.; and they occur at integral values thereof.

In order to eliminate most of the higher "altitude holes," but not the zero and lower "altitude holes," prior systems provide an elongation in the cross-section of the Doppler-radar antenna beams transverse to the ground direction of flight. Thus the direction of elongation is a function of aircraft drift angle and varies with respect to the axis of the aircraft. Accordingly, the antenna system for such elongated beams must be rotatably supported under the aircraft; which adds other problems, such as rotatable waveguide joins and a large servo system for positioning the antenna in azimuth.

The present invention avoids these difficulties found in prior Doppler navigation systems. The invention provides a Doppler-navigator frequency scheme which permits filtering of the first Bessel sideband determined by a modulating-frequency low enough to eliminate all "altitude-holes" in the entire altitude range of present aircraft. Use of the first Bessel sideband also eliminates the "altitude-hole" near zero altitude, which is unique for the first sideband. The fact that the invention has no zero "altitude hole" permits it to begin operation before the aircraft leaves the ground. This minimizes errors in integrating types of computers which give continuous readouts of aircraft position. Higher-order sidebands have a wide zero "altitude-hole" when their modulation frequency is low, and it gets wider as the modulation frequency becomes lower.

Another unique advantage of the invention is that by avoiding the comb-response of prior systems it eliminates the need for elongated beams that require a rotatably-mounted antenna. Thus, the invention can use a less expensive antenna system fixed to the aircraft without rotatable joints and without any antenna servo system.

Another unique advantage of using the first-order sideband with a low modulation frequency is that the received signal remains constant over a large altitude range. That is, the received first-sideband signal increases in amplitude with increased altitude by an amount in the receiver that offsets the increased attenuation of the signal due to increased propagation distance, when the reflection coefficient remains constant. This greatly reduces the automatic-gain-control requirements for the receiver, and likewise decreases the dynamic-amplitude range needed for its intermediate frequency amplifiers.

Another important, although not very obvious, advantage of the invention is its substantial avoidance of navigational errors caused by reflections from rain below an aircraft. Rain moves at unknown velocities which import unknown Doppler-shift errors to the received signal to give erroneous navigation information. Actually, only a small percentage of received beam energy is reflected from the rain, and most is reflected from the earth below. However, due to the proximity of the rain, the signal reflected from it travels less distance and is attenuated less than the earth-reflected signal. Consequently, in prior navigation systems the rain-reflected signal can be weighted much greater than ground-reflected signal by an amount dependent upon the respective propagation distances. However, in the invention, a smooth modulation-index variation occurs internally to prevent the rain-reflected signal from being significantly weighted more than the ground-reflected signal. Thus, a small percentage of rain-reflected signal is maintained in its true perspective by the invention as being relatively small compared to the ground-reflected signal so that the ground-reflected signal controls the navigational indications of the system.

It is, therefore, an object of this invention to provide a frequency system for a Doppler navigator which avoids "altitude holes" over the entire altitude range of an airplane, including while it is on the ground.

It is another object of this invention to provide a frequency system for a Doppler navigator which avoids the comb-type slope distortion of the signal and resulting detection errors found in prior systems.

It is still another object of this invention to provide a navigator frequency system which avoids navigation errors due to rain reflections.

It is a further object of this invention to provide a frequency system for a Doppler navigator that minimizes receiver automatic-gain-control requirements and the dynamic-amplitude range requirements for its intermediate-frequency amplifiers.

It is still a further object of this invention to provide a Doppler navigation system which is capable of relatively simple calibration while the aircraft is on the ground.

It is still another purpose of this invention to provide a Doppler navigation frequency system which is compatible with fixed-mounted antennas in an aircraft, thereby eliminating the need for servoed antennas required by many prior systems.

Further objects, features and advantages of this invention will become apparent to a person skilled in the art after studying the following specification and accompanying drawings, in which:

FIGURE 3 represents a zero-velocity received intermediate-frequency spectrum;

FIGURES 4 and 5 illustrate received intermediate-frequency spectrums with forward and backward velocities;

FIGURE 6 illustrates another embodiment of the invention;

Figure 8:
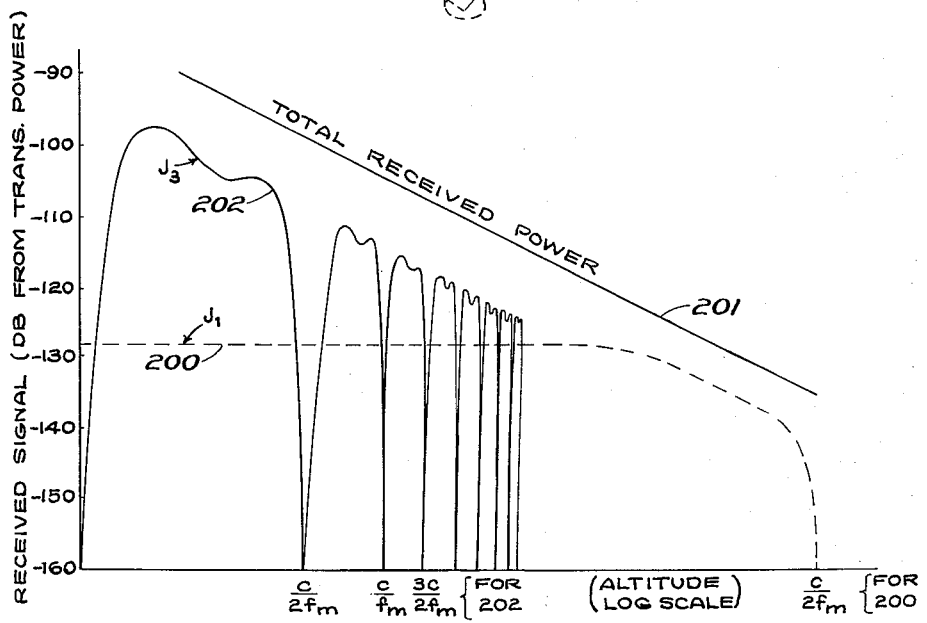

FIGURES 7(A), (B), (C), and (D) illustrate a time-sharing sequence used in FIGURE 6; and, FIGURE 8 shows curves illustrating altitude-variation for different types of received signals.

Figure 1:
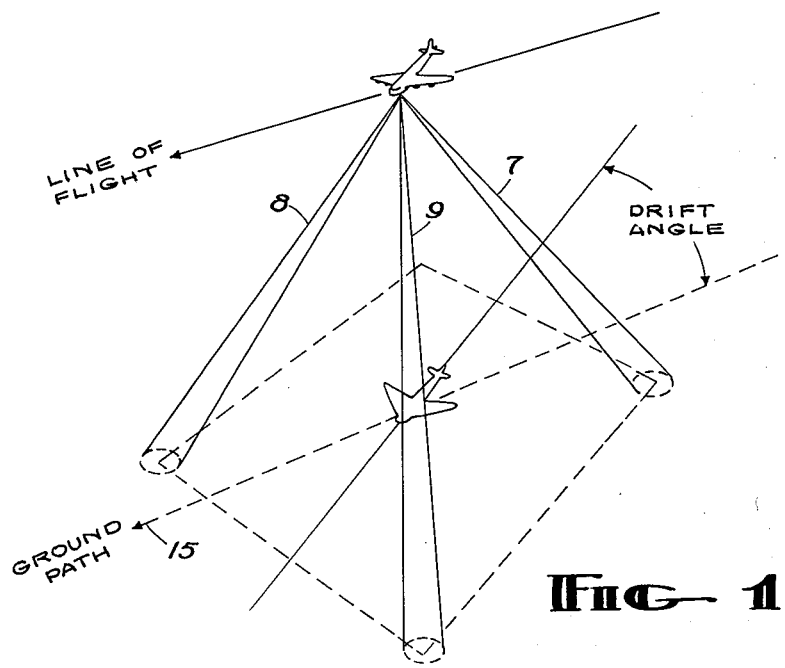
FIGURE 1 shows an aircraft having three Doppler-navigator antenna beams.

We will now consider FIGURE 1 for a more detailed discussion of the invention. It shows an aircraft in flight having three downwardly-directed Doppler-navigator antenna beams 7, 8 and 9. Beams 8 and 9 are directed in the forward direction of the aircraft at an azimuth angle of 45° on opposite sides of the aircraft axis. Beam 7 is directed rearwardly at 45° in azimuth from the axis. The beams are positioned from the vertical by about 20° and the beam widths are preferably very narrow, for example about 3°.

The direction of ground-path 15 and the ground-speed along path 15 are determinable from the Doppler-frequency shift of the three beams. The two forward beams provide the velocity component transverse to the aircraft, and the left front and rear beams provide the velocity component longitudinal of the aircraft. They are combined by a computer to give the ground speed and drift angle. An obvious advantage of the three-beam technique is that it allows fixed non-servoed antennas to be used in an aircraft, and thereby eliminates the need for stabilized platforms needed in other systems. The three-beam antenna system also reducees errors caused by aircraft attitude variations. The three-beam system is known in the art and accordingly will not be explained in detail herein. See the 1957 and 1958 "Proceedings of the National Conference on Aeronautical Electronics" sponsored by the Dayton Section of the Institute of Radio Engineers.

Figure 2:
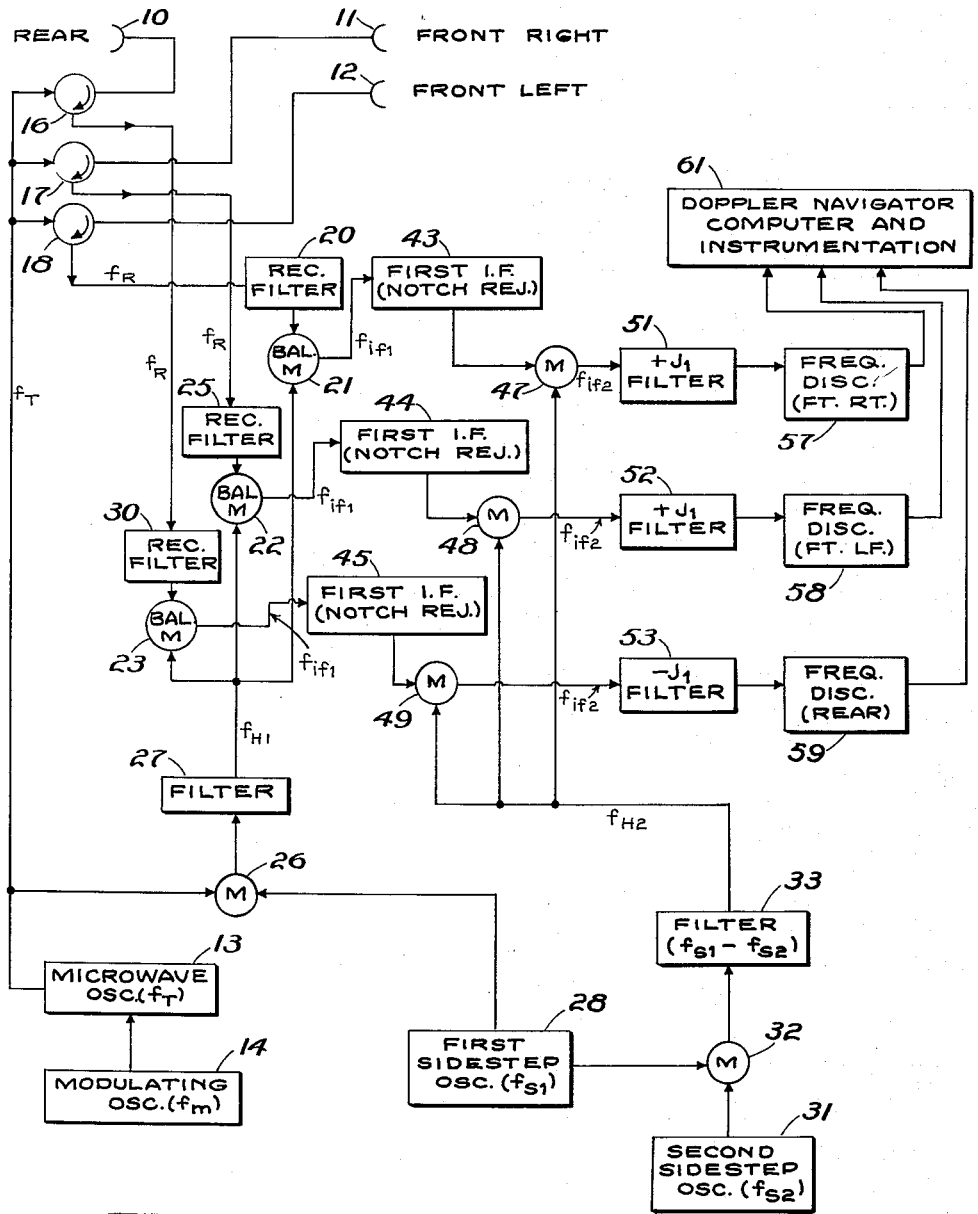
FIGURE 2 is a block diagram of one form of the invention.

FIGURE 2 demonstrates a form of the invention in which the three beams are energized simultaneously. FIGURE 6, on the other hand, illustrates a more economical, and accordingly, more preferred form of the invention, wherein the three-antenna beams are energized sequentially on a time-shared basis, thus eliminating the need for many of the filters which are necessary in the simultaneous system of FIGURE 2.

FIGURE 2 is first considered, since it appears more simple. It shows a microwave oscillator 13, which is frequency-modulated at a frequency $f_m$ by a modulating oscillator 14. Thus the output of oscillator 13 provides a sine-wave modulated F.M. signal $f_T$, which may be defined as follows:

$$f_T = f_c + \beta \sin \omega_m t \quad (1)$$

Wherein $f_c$ is the carrier frequency, $\beta$ is the modulation index determined by the amplitude setting of oscillator 14, $\omega_m$ is $2\pi f_m$, and $t$ is time.

A plurality of circulators 16, 17 and 18 have inputs connected to oscillator 13 and have transmitting-signal outputs respectively connected to rear antenna 10, front-right antenna 11 and front-left antenna 12.

The antennas are each simultaneously used for transmit and receive functions. The other output from each circulator provides the received signal segregated from the transmitted signal. Conventional circulators or turnstile junctions are available for providing the segregation.

A plurality of receiver filters 20, 25 and 30 are connected to the received signal outputs from the circulators. A plurality of balanced frequency mixers 21, 22 and 23 have inputs respectively connected to outputs of the filters.

Each of the balance mixers has another input which receives a local heterodyning signal $f_{H1}$ provided from the output of a first sidestep filter 27. Frequency $f_{H1}$ is derived from a mixer 26. It receives transmitted signal $f_T$ as one input from the microwave oscillator and receives another input frequency $f_{s1}$ from a first sidestep oscillator 28. Filter 27 selects that mixer frequency which is either the sum or difference between its input frequencies. Furthermore, receiver filters 20, 25 and 30 provide delays for internally reflected signals to equalize the delay caused to the modulation by filter 27.

The received signal will be Doppler shifted in frequency by an amount proportional to the velocity of the aircraft; and the received signal will be heterodyned in mixers 21, 22 and 23 about the value of frequency $f_{s1}$. However, due to matters beyond the control of the designer of practical equipment, there will be reflections of the transmitted signal internal to the equipment which will reach the balanced mixers and will pass through them. Frequency-wise the reflections will be in the same frequency-band as the received signal. Because the received signal will be attenuated greatly, due to propagation and ground-reflection losses, the internally reflected signal may be large in comparison to the received signal, in spite of all practical precautionary measures.

Accordingly, I.F. amplifiers 43, 44, and 45 are connected to the outputs of the respective balance mixers, and each include a notch-filter tuned to the center of the I.F. band, which is at frequency $f_{s1}$. The filters will reject frequency $f_{s1}$ without rejecting the Doppler-shifted sidebands of the received signal. Because of the lack of any phase difference between the modulations of the internally reflected signal and the sidestep filter signal, virtually all of the reflected energy at each balanced mixer output is in its carrier frequency with almost none in sidebands. The theory for this is discussed later herein. I.F.'s 43, 44 and 45 may be conventional amplifiers each having a crystal-filter providing a rejection notch. For example, frequency $f_{s1}$ may be 30 megacycles.

A second frequency conversion is provided by mixers 47, 48 and 49 having inputs respectively connected to the outputs of I.F.'s 43, 44 and 45. A second heterodyning frequency $f_{H2}$ is provided to each of the other inputs of mixers 47, 48 and 49. Frequency $f_{H2}$ is derived from a filter 33 connected to the output of a mixer 32, which has inputs receiving frequency $f_{s1}$ from first side-step oscillator 28 and a frequency $f_{s2}$ from a second sidestep oscillator 31. Filter 33 may select either the sum or difference mixer-output frequency between its two inputs. It is assumed hereafter in this embodiment that the difference frequency is selected for low-side injection into the mixers.

The frequency outputs of the second set of mixers 47—49 have a stability independent of the stabilities of oscillators 13, 14 or 28, but their stabilities are solely dependent upon the stability of second sidestep oscillator frequency $F_{s2}$ which might have a frequency of 147 kilocycles per second. The heterodyned stability can be shown as follows:

$$f_{H1} = f_T - f_{s1} \quad (2)$$

On the other hand, the received signal $f_R$ can be represented as follows:

$$f_R = f_c + f_d + \beta \sin \omega_m (t - \tau) \quad (3)$$

Where $f_d$ is the Doppler shift, and $\tau$ is the signal delay time in propagating to and from ground.

Hence, the output of the balanced mixer in each channel is represented by the difference between Expressions 2, 3, which provides the following:

$$f_{if1} = f_{s1} + f_d + \zeta \cos \omega_m \left(t - \frac{\tau}{2}\right) \quad (4)$$

Where: $\zeta$ is the modulation index at the mixer output and:

$$\zeta = -2\beta \sin \omega_m \frac{\tau}{2} \quad (5)$$

The second local heterodyning frequency $f_{H2}$ is:

$$f_{H2} = f_{s1} - f_{s2} \quad (6)$$

Then the second mixer output frequency $f_{if2}$ is:

$$f_{if2} = f_{if1} - f_{H2} \quad (7)$$

This mathematically reduces to the following:

$$f_{if2} = f_{s2} + f_d + \zeta \cos \omega_m \left(t - \frac{\tau}{2}\right) \quad (8)$$

Only the first Bessel-function sideband of the entire received signal defined by (8) is utilized in the invention. However, for filtering purposes that will become evident later, only the upper first side-band (designated $+J_1$) is used with the forward-antenna signals. Filters 57 and 58 select the $+J_1$ sideband in the forward-antenna channels.

And the lower-order first Bessel side-band, designated $-J_1$ is used with the rearward antenna signal. A filter 53 selects the $-J_1$ side-band in the rearward-antenna channel.

Respective frequency discriminators 57, 58 and 59 are connected to the respective side-band filters and measure the frequency-shift of the respective first-order sidebands. Frequency discriminators 57, 58 and 59 may be conventional.

Doppler navigation systems of other types are in the prior art, and hence means for computing and utilizing Doppler-navigation information is known in the art along with the instruments for displaying information, such as ground speed and drift angle. Therefore this specification will not go into detail regarding computation and utilization means, which is represented generically by block 61.

The spectrum found at the output of respective I.F.'s under different conditions is represented by FIGURES 3, 4 and 5. FIGURE 3 illustrates the spectrum at zero aircraft velocity. A received signal 101 is represented by a spectrum about each of the Bessel function terms $J_0$, $\pm J_1$, $\pm J_2$, etc.

The relative amplitudes of the carrier and side-bands are determined by I.F. modulation index $\zeta$ as defined in Expression 5 (above). It is dependent only upon the delay $\tau$, since the transmitter modulation index $\beta$ and the modulating frequency $\omega_m$ are fixed.

The leakage signal 100 is caused by the internally-reflected signal from oscillator 13 which is unavoidably reflected from antenna terminals and other junctions in the equipment (since some degree of mismatch cannot be avoided in practice). The leakage signal finds its way into balanced mixers 21, 22 and 23, along with the received signal.

However, the leakage signal provides almost no sidebands to interfere with the received signal sidebands. This is because the delay $\tau$ of the internally-reflected signal is almost zero; and hence the modulation index $\zeta$ of the I.F. signal is almost zero (see Expression 5 above). With zero modulation-index for an F.M. signal, all of its energy is in its carrier frequency. Consequently, very little energy is found in the first order side-bands $\pm J_1$ of the leakage signal at the mixer outputs. On the other hand, the received signal will have a substantial delay $\tau$. Hence, the transmitter noise surrounding the leakage signal is frequency separated from the received signal and may be eliminated by filtering. The notched filters in the I.F.'s obtain the necessary attenuation of the leakage and received signal carrier and adjacent noise components.

Delay $\tau$ varies linearly with the altitude of the aircraft: linearity exists as long as $\tau$ is much less than $$\frac{1}{f_m}$$

during which the received-signal modulation index increases linearly with altitude. Consequently, the energy distribution between the carrier and side-bands of the received I.F. signal changes in a very desirable manner.

Since the attenuation of the received-signal also increases linearly with increase in altitude, it has been found that the increase in first side-band energy, due to changing I.F. modulation index off-sets the loss of first side-band energy caused by increase in altitude. As a result, the first side-band energy at the I.F. output remains very nearly constant as $\tau$ varies from zero to about $\frac{1}{3} f_m$. This is shown by curve 200 in the FIGURE 8. With proper choice of modulating frequency $f_m$, substantial linearity can be maintained over a large altitude range. As $\tau$ increases beyond $\frac{1}{3} f_m$ the first sideband amplitude drops by only a small amount until $\tau$ is about $0.9/f_m$, and thereafter the amplitude quickly drops off and is zero when $$\tau \text{ equals } \frac{1}{f_m}$$

Thus, the energy of the $J_1$ signal does not vary by more than thirteen decibels when $\tau$ varies between zero and about $0.9/f_m$. For example, a modulating frequency of 8 kilocycles used with beams angled 45° in azimuth from the direction of the aircraft and 20° from the vertical has its $J_1$ signal remain almost perfectly constant between 10 feet and 18,000 feet and thereafter does not decrease by more than 13 decibels up to 45,000 feet, which is a practical altitude limit for present commercial aircraft. The linear signal range can be increased to as large an amount as is desired by decreasing the modulation frequency $f_m$. A practical limit, however, is reached since the first sideband will move into the noise as $f_m$ is decreased excessively.

In FIGURE 8, the variation of total energy with altitude change is illustrated by straight line 201. The superiority of the first side-band $J_1$ represented by a curve 200 is evident, since it remains linear virtually down to zero altitude.

The invention provides a technique for obtaining the required filtering of the $J_1$ side-bands. The band-passes required for filters 51, 52 and 53 can better be understood by first considering the effects of aircraft velocity upon the spectrum at the second mixer outputs. FIGURE 4 illustrates a typical spectrum for the second I.F. signal, in either of the forward antenna channels. The forward velocity increases the frequencies in the received spectrum of the forward antennas by the Doppler shift. Thus, the received frequency spectrum shifts to the right of the I.F. frequency $f_{s2}$ in FIGURE 4 by the Doppler shift $f_d$.

It can be seen in FIGURE 4 that as the Doppler-shift increases, the $-J_1$ side-bands fades into the leakage noise spectrum and is lost. On the other hand, with increased velocity, the $+J_1$ term moves away from the leakage noise spectrum. Hence the $+J_1$ term is capable of being filtered. A filter bandpass 102 as shown in FIGURES 3 and 4 is provided for each of filters 51 and 52 to select the $+J_1$ sideband of their respective signals. The bandpass of each filter 51 and 52 is provided by constructing it as either a crystal-lattice net work or a mechanical filter. Their minimum cutoff frequency 103 is placed slightly higher than the $+J_1$ sideband of the local leakage spectrum. (As explained above, the delayed $\tau$ of the local leakage signal is very nearly zero; and accordingly, it provides almost no sideband energy in the I.F. filters. However, since the delay $\tau$ of the leakage signal is not quite zero, there will be a slight amount of sideband energy for the leakage spectrum.) Accordingly, by placing the minimum filter cut-off frequency 103 slightly above the $+J_1$ leakage side-band, it is rejected. Of course, the signal $+J_1$ side-band will also fall below cut-off frequency 103 when the aircraft forward velocity decreases below a certain value. This value is determined by the minimum forward velocity needed to sustain level flight, since the Doppler-shifted signal is not used below that velocity anyway.

On the other hand, the maximum cut-off frequency 104 of filter bandpass 102 is placed slightly below the $+J_2$ side-band of the local leakage signal in order to attenuate it. This permits a maximum forward velocity resulting in a Doppler shift $f_d$ that is only slightly less than $f_m$. Doppler shifts in excess of this will place the $+J_1$ side-band out of the filter bandpass 102.

With the rearward antenna, an opposite Doppler shift $(-f_d)$ is obtained and is shown in FIGURE 5, wherein received signal spectrum 101 shifts to the left with respect to I.F. frequency $f_{s2}$. Thus the $+J_1$ side-band moves into the noise spectrum about the carrier of the leakage signal and is lost. However, the $-J_1$ side-band moves away from the local noise spectrum with increasing Doppler shift and is the used signal. A filter bandpass 106 is provided for filter 53 to select the $-J_1$ side-band. Its bandwidth is the same as filter 102 in FIGURE 4, but the bandpass of filter 106 is lower in frequency and is between the $-J_1$ and $-J_2$ signal sidebands with no Doppler shift. The spacing of bandpass 106 with respect to the nearest leakage sidebands is the same as that used in FIGURE 4. Such spacing is about 1% of $f_m$.

Consequently, the bandpass of each filter 51 and 52 will be between the frequency $(f_{s2}+f_m)$ and $(f_{s2}+2f_m)$. On the other hand, the bandpass 106 of filter 53 is between the frequencies $(f_{s2}-2f_m)$ and $(f_{s2}-f_m)$.

It has been determined that the attitude of an aircraft changes sufficiently slowly that if the signal provided from the three antennas is time-shared at a one second sequential rate or faster, there will be no significant loss in attitude-cancellation information with respect to the detected ouputs. This determination makes time-sharing feasible. Other considerations make a time-shared system more economical than the three channel simultaneous system of FIGURE 2. FIGURE 6 illustrates a time-shared system utilizing the same $J_1$ side-band components utilized in FIGURE 2. A basic economy of the time-shared system is that it eliminates two of the three channels and thereby requires only a single $J_1$ selection filter rather than the three filters required in FIGURE 2.

A timing source 180 which has three outputs of 181, 182 and 183 provides the time-sharing sequence for the system. The timing of these outputs is shown in FIGURES 7(A), (B), and (C) respectively. These timing pulses have a duration of one second with two seconds intervening between pulses.

Many of the items in FIGURE 6 may be the same as in FIGURE 2. Accordingly, the same reference is used to identify the same type of item in both figures, with 100 added in FIGURE 6. Thus, a microwave oscillator 113 is frequency-modulated by an oscillator 114 to provide the signal for transmission as was done in FIGURE 2. However, in FIGURE 6, microwave switching means 170 is connected between oscillator 113 and the respective antennas. Switching means 170 is basically like a single-pole, triple-throw switch; wherein the respective antennas are sequentially connected to microwave oscillator 113. Furthermore, means is necessary to segregate the received from the transmitted signal using their opposite directions of power flow, such as directional-couplers action. The illustrated switching means 170 uses three circulators 171, 172 and 173. Circulators have lossless directional-coupling properties which separate the received signal from the transmitted signal because of their opposite directions of power flow. Circulators 171 and 173 each have a pair of coils for double-throw switching action. Circulator 171 is used to connect energy source 113 to rear antenna 110 for one second and for the next two seconds to connect the other pair of circulators to source 113, during which the front antennas are sequentially energized by circulator 173. A pair of diodes 177 and 178 are used to combine the pulsing of lines 181 and 182 to obtain a single pulse lasting for the two second period during which both forward antennas are energized sequentially. Circulator 172 improves the isolation between receive and transmit function, for the forward antennas. Other forms of switching means are available in the art to satisfy these requirements of switching means 170.

Simultaneously, with the connection of the respective antennas to oscillator 113, received energy is provided from output 174 of circulator 171 to an input of a balanced mixer 121. Local heterodyning frequency $f_{H1}$ is provided to the other input of mixer 121 to obtain an output frequency $f_{if1}$, exactly as was done in FIGURE 2. The components for generating $f_{H1}$, in FIGURE 6 are thus precisely the same as those shown in FIGURE 2.

A notch-filter 143 passes the I.F. spectrum, but further rejects the received leakage carrier and their adjacent noise as was done in FIGURE 2. A second mixer 147 receives the output of I.F. 143. Mixer 147 has another input which receives sequentially local frequencies $f_{H2}$ and $f'_{H2}$. Here, the frequency scheme of FIGURE 6 differs from that of FIGURE 2, in order to permit a single $+J_1$ filter 151 to be used with the output of mixer 147. The frequencies $f_{H2}$ and $f'_{H2}$ differ by equal amounts on opposite sides of the center frequency $f_{s2}$. That is, the $f_{H2}$ provides a low-side injection, which maintains the sidebands in the same order at the mixer output as received at the mixer input. On the other hand, the $f'_{H2}$ is a high-side injection frequency that inverts the upper and lower side-bands at the output of the mixer from the order received by it. Hence, the $-J_1$ side-band of the inverted spectrum fails in the same frequency range as the $+J_1$ side-band of a non-inverted spectrum. Furthermore, due to time-sharing, there is no interference between the different side-bands.

The high and low injection frequency $f_{H2}$ and $f'_{H2}$ are derived from side-step oscillators 128 and 131, which have their outputs combined in a mixer 132.

A low-side filter 133 selects the mixer frequency $(f_{s1}-f_{s2})$ and a low-side filter 134 selects frequency $(f_{s2}+f_{s2})$. A $\pm J_1$ selector switch 136 has inputs connected to outputs of filters 133 and 134. Selector switch 136 is basically a double-throw switch, with the filters connected to opposite sides. The common terminal of the switch provides its outputs and is connected to mixer 147. As shown, the selector switch normally connects low-side filter 133 to the mixer, and connects high-side filter 134 in response to pulses provided by line 183. Hence, high-side injection $f'_{H2}$ is provided only during the period that rearward antenna 110 is energized to provide the $-J_1$ sideband in an inverted form that can pass through filter 151. On the other hand, during the periods that the forward antennas are energized, the low-side injection $f'_{H2}$ is provided so that the $+J_1$ side-band passes through filter 151.

A plurality of switches 161, 162 and 163 have inputs connected to the output of filter 151. The switches segregate the three signals time-shared in filter 151. The switches have control inputs respectively connected to leads 181, 182 and 183 for synchronous actuation with the energization of the respective antennas. Thus, the front-right antenna signal is passed by switch 161, the front-left antenna signal by switch 162, and the rear antenna signal by switch 163. Frequency discriminators 157, 158 and 159 are respectively connected to the outputs of switches 161, 162 and 163. The discriminators 157, 158 and 159 each may be made in the manner taught in application Serial #796,686, filed March 2, 1959, by Edwin M. Stryker, Jr., titled "Automatic Calibration Means" and assigned to the same assignee as the present application.

Doppler-navigator computors and instruments 161 are of the type known in the art which receives and processes the Doppler information provided at the outputs of the respective discriminators.

Although this invention has been described with respect to particular embodiments thereof, it is not to be so limited, as changes and modifications may be made therein which are within the full intended scope of the invention as defined by the appended claims. For example, a single frequency conversion could be used.

I claim:
1. In a Doppler-navigation system having at least two downwardly directed antenna beams comprising a microwave oscillator, a modulating oscillator connected to said microwave oscillator to frequency modulate it to generate a transmitted signal, energy direction-segregating means connected between said microwave oscillator and said antennas to direct a received signal of said antenna to a receiver input, heterodyning means, waveguide means connecting an input of said heterodyning means to said receiver input, means for translating said transmitted signal by an intermediate-frequency to provide a translator signal, said translating means being connected to said heterodyning means for frequency beating said received signal and said translated signal, an output of said heterodyning means providing an intermediate frequency-modulated signal having a center-frequency and first and second sidebands, a first sideband filter connected in tandem with an output of said heterodyning means, said filter having a passband between a first and a second sideband of said intermediate frequency-modulated signal without Doppler-shift, said passband being located on the side of said center-frequency in the direction of Doppler-shift for one of the first-sidebands of the intermediate frequency modulated signal, and said one first sideband being selected as the output signal of said sideband filter and being the signal used by following portions of said Doppler-navigation system.

2. A frequency system for a Doppler-navigator, comprising at least three independent antenna beams oriented in different downward directions, a microwave oscillator, a modulating oscillator connected to said microwave oscillator to frequency-modulated and generate a transmitted signal, $f_T$; received-signal segregating means connected between said microwave oscillator and said antennas, said segregating means having a received-signal output, receiver-filter means connected to said received-signal output to pass a received signal, heterodyning means having one input connected to said receiver-filter means, a frequency mixer means connecting one input of said mixer to said microwave oscillator, a side-step oscillator having a frequency $f_s$ connected to another input of said mixer, a side-step filter connected between an output of the mixer and an input of said heterodyning means to selected one of a pair of mixer output frequencies $(f_T+f_s)$ and $(f_T-f_s)$, a first-sideband filter connected in tandem with an output of said heterodyning means to receive from it a heterodyned signal, said first-sideband filter constructed with a passband between first and second sidebands of the heterodyned signal with no Doppler-shift, said passband being located on the side of a center frequency of the heterodyned signal in the direction of its Doppel-shift, and frequency-detection means receiving the output of said sideband filter to determine the Doppler-shift.

3. A frequency system for a Doppler-navigator, comprising at least two independent antenna beams oriented in different downward directions, with two of said beams directed forwardly, and the third directed rearwardly, a microwave oscillator, a modulating oscillator connected to said microwave oscillator to frequency-modulate it to generate a transmitted signal, antenna-switching-and-signal-segregating means connected between said microwave oscillator and said antennas, said means having a plurality of received-signal outputs for segregating respective signals received by respective antennas, receiver-filtering means connected sequentially to said receiver-signal outputs, first heterodyning means having one input connected to said receiver-filtering means; first sidestep-frequency means for translating said transmitted frequency by a first intermediate-frequency $f_{s1}$ being connected to said first heterodyning means, a notch-filter being connected to an output of said first heterodyning means, a second heterodyning means having an input connected to said notch-filter, a second sidestep-frequency means for translating said first intermediate- frequency $f_{s1}$ by a second intermediate-frequency $f_{s2}$, first sideband filter means having a passband between a first and second sideband of a frequency-modulated signal with no Doppler provided at an output of the second heterodyning means, said passband being located in the direction of the first sideband with Doppler-shift, signal-distribution means following said second amplifier, and a local-timing source connected to said signal-distribution means and said antenna-switching-and-signal-segregating means.

4. A frequency system, as defined in claim 3, in which said sideband filter has its cut-off frequencies positioned by about 1% of the modulating frequency from the first and second sideband with no Doppler-shift.

5. In a Doppler-navigation system having at least two downwardly directed beams, with at least one beam directed forwardly, and the other beam directed rearwardly, comprising a microwave oscillator, a modulating oscillator connected to said microwave oscillator to frequency modulate it to generate a transmitted signal, a plurality of energy-direction-segregating means connected between said microwave oscillator and said antennas to direct respective received signals to a plurality of receiver inputs, a plurality of heterodyning means having inputs respectively connected to said receiver inputs, means for frequency-translating said transmitted signal by an intermediate-frequency to provide a translated signal, said frequency-translating means being connected to each of said heterodyning means, an output of each of said heterodyning means providing a heterodyned signal with a center-frequency and first and second side-bands, a plurality of first-sideband filters each having a passband between the first and second sidebands of the respective heterodyned signal without Doppler-shift, said passband being located on the side of said center-frequency in the direction of the respective first-sideband with Doppler shift.

6. A system as defined in claim 5 in which a plurality of notch-filters are connected in tandem with said heterodyning means, with said notch-filters rejecting said intermediate-frequency.

7. A frequency system for the predetection portion of a Doppler navigator, comprising at least three independent antenna beams oriented in different forward and rearward directions, a microwave oscillator, a modulating oscillator connected to said microwave oscillator to frequency-modulate it to provide a transmitted signal, a received-signal segregating means connected between said microwave oscillator and said antennas, said segregating means having a plurality of received-signal outputs to provide the respective received signals of said antennas, a receiver-filter means, antenna-switching-means for sequentially providing the received-signal outputs of the respective antennas to said receiver-filter means, means for translating the transmitted signal by an intermediate-frequency to provide a translated signal, means for heterodyning an output of said receiver-filter means with said translated signal, an output of said heterodyning means being a frequency-modulated wave with a center-frequency and first and second sidebands, notched-filter means being connected to an output of said heterodyning means to notch reject its output signal at said given frequency, a sideband filter means connected in tandem with said notched-filter means, said sideband filter means having a passband between the first and second sidebands without Doppler-shift, said passband being located in the direction of Doppler-shift of said first side-band, an output signal of said sideband filter means being a Doppler-shifted signal provided for detection.

8. A frequency system, as defined in claim 7, in which said sideband filter has its cut-off frequencies positioned by about 1% of the modulating frequency from the first and second sidebands with no Doppler-shift.

9. A frequency system as defined in claim 8 in which said translation means accomplishes frequency-translation by the intermediate-frequency in opposite directions, means for synchronizing said opposite translations with said antenna-switching means.

10. A frequency scheme as defined in claim 7, in which said heterodyning means and said translating means include a first frequency mixer having an input connected to an output of said receiver-filter means, a second mixer having an input receiving said transmitted signal, a first sidestep oscillator connected to another input of said second mixer, a first sidestep filter connected between an output of said second mixer and another input of said first mixer, a third mixer, said notched filter being connected between an output of said first mixer and an input of said third mixer, a fourth mixer having an input connected to said first sidestep oscillator, a second side-step oscillator being connected to another input of said fourth mixer, a high-side filter and a low-side filter being connected to an output of said fourth mixer, a selector-switching means having opposite inputs connected to outputs of said high-side and low-side filters and having an output connected to an input of said third mixer, and means for actuating said selector-switching means together with said antenna-switching means to connect said high-side and low-side filters to said third mixer in synchronism with signals from said forward and rearward antennas.

11. A frequency system for a Doppler navigator, comprising at least three independent antenna beams oriented in downward directions, with different of said beams directed forwardly and some rearwardly, a microwave oscillator, a modulation oscillator connected to said microwave oscillator to frequency-modulate it to provide a transmitted signal, a plurality of signal-segregating means connected respectively between said microwave oscillator and said antennas, each of said segregating means having a received-signal output from a different antenna, a plurality of forward and rearward antenna channels, a plurality of receiver-filter means of said channels connected respectively to said plurality of received-signal outputs to pass the respective antenna received signals to different channels, a plurality of balanced mixers in the respective channels, each balanced mixer having an input connected to a different one of said received-filter means, a frequency mixer, a side-step oscillator connected to an input of said frequency mixer, another input of said frequency mixer connected to said microwave oscillator, a side-step filter connected between an output of said mixer and an input to each of said balanced mixer, a plurality of first-sideband filters respectively provided in said channels and connected in tandem to respective outputs of said balanced mixers, the sideband filters receiving signals from forward directed antennas having a passband located between first and second side bands on one side of a signal carrier and said sideband filter receiving signals from said rearward antennas being located on the opposite side of the carrier frequency between first and second sidebands with no Doppler shift.

References Cited in the file of this patent

UNITED STATES PATENTS 2,857,590     Berger _____ Oct. 21, 1958